Nov. 24, 1964   J. GRUNFELDER   3,158,203
HELICOPTER ROTORS

Filed Jan. 15, 1963   8 Sheets-Sheet 1

Nov. 24, 1964  J. GRUNFELDER  3,158,203
HELICOPTER ROTORS

Filed Jan. 15, 1963  8 Sheets-Sheet 5

United States Patent Office 3,158,203
Patented Nov. 24, 1964

3,158,203
HELICOPTER ROTORS
Jean Grunfelder, Paris, France, assignor to Sud-Aviation, Societe Nationale de Constructions Aeronautiques, Paris, France, a company of France
Filed Jan. 15, 1963, Ser. No. 251,593
Claims priority, application France, Jan. 19, 1962, 885,354; July 20, 1962, 904,673
6 Claims. (Cl. 170—160.12)

Certain light helicopters used in military or naval work are equipped with folding rotor blades and when they are stored with their blades folded for reasons of camouflage or in order to reduce their overall bulk, they should be capable of being brought into a state of readiness in the minimum time so as not to delay their readiness for action.

More particularly, the connection of the rotor blades to each of the arms of the hub can be effected by two substantially vertical pins which are situated symmetrically on either side of the longitudinal axis of an arm, so that when one of the pins is demounted the other may be used as the pivot pin on which the blade can be folded.

Bringing the blades into action quickly, therefore, involves re-positioning the pin which has been demounted in the shortest possible time.

For this purpose, the present invention relates to a device for the automatic positioning of a pin in a bore constituted by the coincidence of at least two superposed apertures arranged in two members which are mobile with respect to one another, in which device the said pin is held within a tubular element fast with the first member and co-axial with the aperture therein, by the two limbs of a spring which are held towards one another by the attachment of their ends to the wall of the tubular element, the said spring being urged, by means of a mechanical transmission carried by the said first member, in the sense of detaching its ends when one of the elements of this transmission is encountered by the second member in its displacement towards bringing the apertures in the two members into coincidence.

Thus, as soon as the spring is detached, its two limbs move resiliently away from one another, which instantaneously releases the pin for its engagement in the bore. The pin may be driven into this bore by its weight alone, in which case it is necessary for its axis to be substantially vertical, or it may be pushed into the bore by an auxiliary force such as that of a spring.

In one advantageous form of embodiment, the pin and the bore are frusto-conical and, at the tapering end, the pin has a screwthread which is intended to receive a locking nut, whilst at the opposite end it is provided with a polygonal head the cross-section of which is smaller than the thickest part of the pin. In this case, the device for positioning the pin is advantageously supplemented by means intended to prevent the pin from rotating when a nut is engaged on its screwthreaded portion.

This means may be constituted by two members whose parallel edges face towards one another and which are lodged in the tubular element transversely of the pin and which are pressed resiliently towards one another but are adapted to be forced apart from one another for the passage of the frusto-conical portion of the pin, notches in the tubular element which are orientated oppositely to the penetrating movement of the pin being adapted to receive the ends of these members when they are in the approached position.

Thus, the members with parallel edges facing one another do not oppose the entry of the pin into the aligned apertures but, as soon as the thickest part of the pin has passed them, they approach one another to embrace the polygonal head of this pin. When a pressure is exerted on the screwthreaded portion of the pin in order to engage the nut, they penetrate into the notches and then oppose the rotation of the pin, gripping the polygonal surfaces of its head.

The invention is illustrated by way of example in the accompanying drawings, in which.

Figure 1:
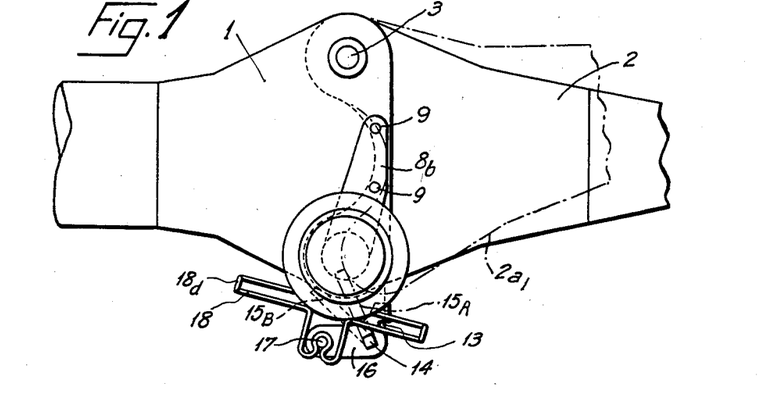
FIGURE 1 is a plan view of a device according to the invention arranged for the re-positioning of the second pin for connecting a helicopter blade to its hub.
Figure 2:
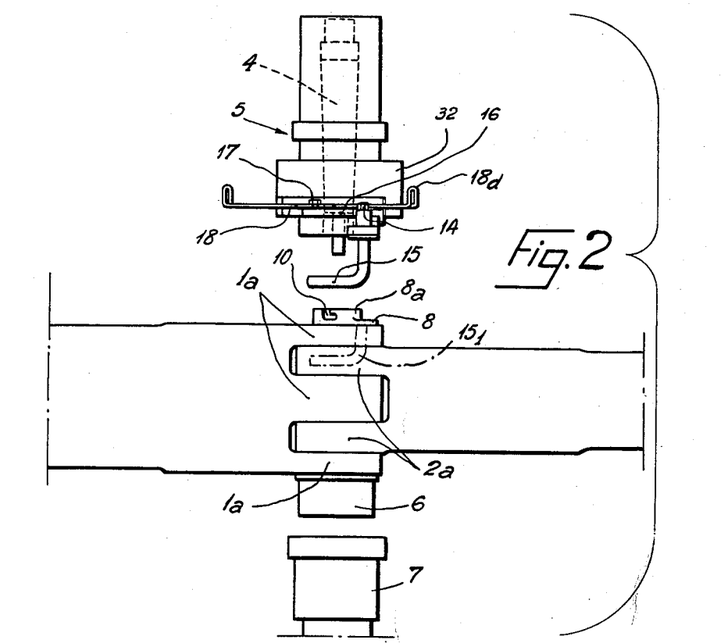
FIGURE 2 is an elevational view, corresponding to FIGURE 1, which shows the various elements used for the automatic connection of a blade to its hub.

In FIGURES 1 and 2, the invention is applied to the connection of a radial arm 1 belonging to a helicopter hub to the root 2 of a rotor blade of the said helicopter. This connection is effected by means of two conical pins: A pin 3 which, permanently remaining in position, serves as a hinge for folding the blade, the other pin 4 being removable and, engaged in the co-axial apertures of the flanges 1a and 2a, locking the connection of the two parts 1 and 2 in the aligned position.

The pin 4 (see also FIGURE 7) comprises a frusto-conical central body 4a a screwthreaded end 4b and a head 4c, which in the case is a square head, and whose cross-section is smaller than that of the thickest part of the pin 4.

The device according to the invention is intended to hold the pin 4 above the part 1 and co-axially with the bores therein, as long as the part 2 is moved away owing to the folding of the blades, and to release this pin 4 so that it falls into the coinciding apertures in the flanges 1a and 2a when, by the deployment of the blades, the flanges 2a returns into engagement in the flanges 1a.

This device, which is given a general reference numeral 5 in FIGURE 2, is advantageously supplemented by a guide 6 which is permanently carried by the part 1 which receives a tightening wrench given a general reference number 7, in which is placed a nut intended to be screwed on to the screwthreaded portion 4b and which limits the clamping force to which this nut is subjected.

Figure 5:
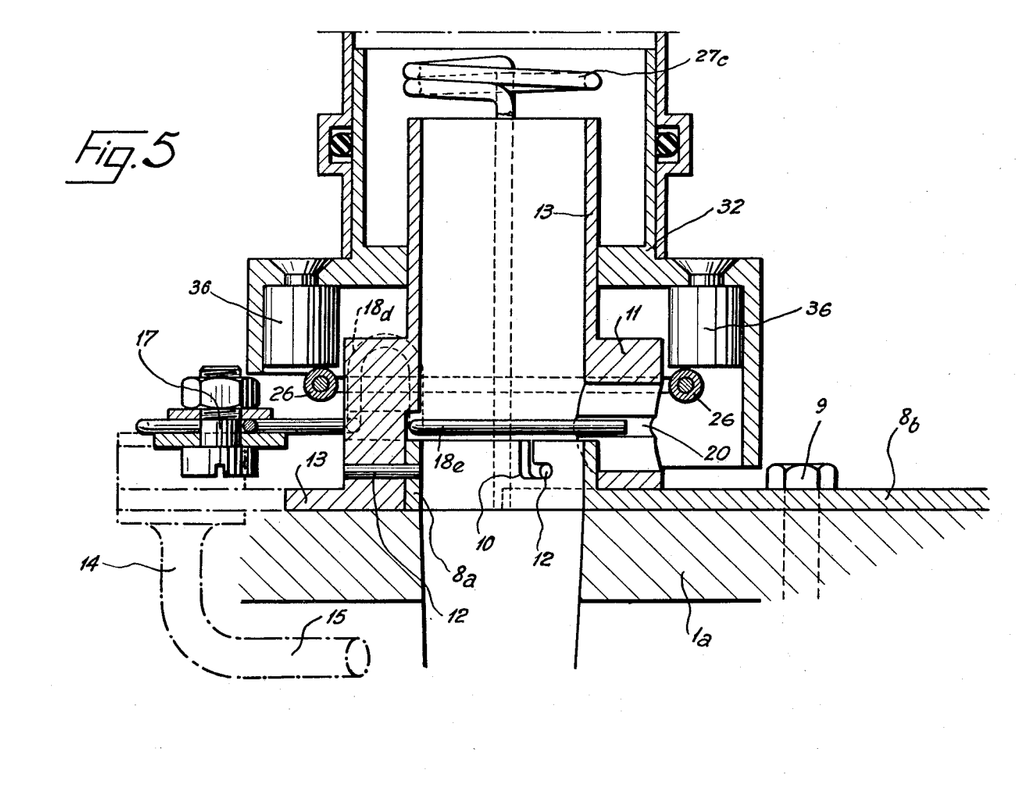

The device 5 is removable; it is fixed on the part 1 by means of the base plate 8 which comprises a cylindrical sleeve 8a co-axial with the aperture in the flanges 1a, and a stem 8b by which the said base plate is fixed against the arm of the hub 1 by means of bolts 9 (FIGURES 1 and 5) engaged in the upper portion of the flange 1a, and the guide 6 is fixed in the same way to the lower portion of the flange 1a.

Figure 4:
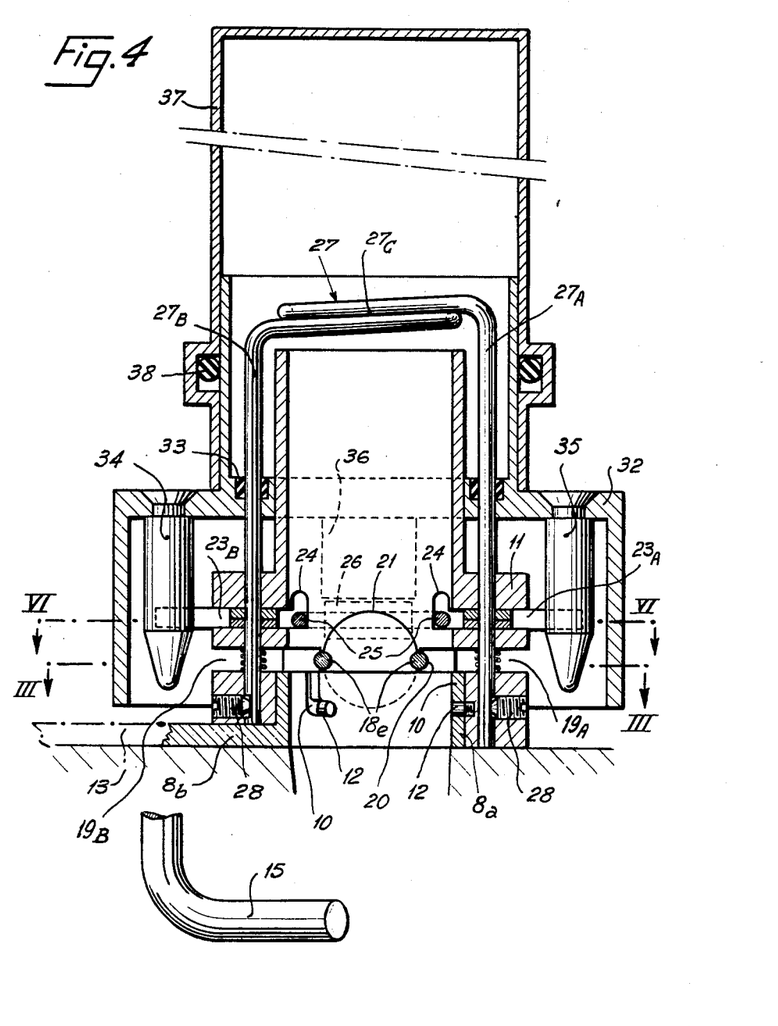
FIGURES 4 and 5 are respectively sectional views taken on IV—IV and V—V of FIGURE 3.

The sleeve 8a is provided with notches of the bayonet type 10 which are intended for the fixing of the device 5. The latter comprises a tubular base 11 which fits over the sleeve 8a and is provided with studs 12 which engage in the notches 10 for fixing to the said sleeve (FIGURE 4).

This base 11 is fast with a strap 13 through which extends a pin 14 parallel to the axis of the base 11 and carrying two crank-pin elements 15 and 16. The crank-pin element 15 (which, in the example illustrated, is the elbowed prolongation of the pin 14), when the device 5 is in position, comes level with the interval corresponding to one of the limbs of the flange 2a (FIGURE 2—position $15_1$), and at this level, it can move between the two positions 15A and 15B (FIGURE 1). In the first position, it is on the path of the flange limb $2a_1$ when the folded blade is brought into the active position; in the second position, it has been repelled by the limb which is then in place. The lever 16 is rendered fast with the pin 14 by a square portion of the pin and is locked by a nut (not shown).

The second crank-pin element 16, by the encounter of its folded limb 16a against the strap 13 (FIGURES 3 and 9) limits the travel of the assembly 14, 15, 16 when the latter is repelled by the blade root. On its pin 17, the crank-pin element 16 carries a wire spring 18 formed of a shaped steel wire, the loaded position of this spring being shown in FIGURE 3 and its relaxed position in FIGURE 9.

This spring in plan view is cross-shaped in general form. The middle of the wire is shaped in the form of an eye 18a which engages on the pin 17, and the two halves of the wire by means of the circular foldings 18b are brought parallel to one another in a relatively spaced-apart position; then these two halves of the wire form two opposite branches 18c which each terminate in arcs 18d. These branches and arcs which add to the elasticity of the spring 18 are intended to enable it to be gripped by hand in order to close it and put it in position. Finally, the terminal portions of the two halves of the wire form two limbs 18e which, by the shape of the spring, tend to remain substantially parallel to one another, whilst being urged apart from one another by the elasticity of the central portion of the said spring.

These limbs 18e are lodged in the two grooves 19A and 19B formed in the base 11, and their ends in the active position come to engage in the lateral notches 20 provided in the circular aperture 21 drilled in the wall of the base 11 (FIGURE 4). In the operative position of the limbs 18e (FIGURE 3), the latter are situated, by virtue of the abutment of the elbows 18f, against the portion 22 left between the grooves 19A and 19B of the base 11, transversely to the bore of the said base, parallel to one another and in an approached position. The pin 4 (FIGURE 7) centered in the base 11, can thus rest on these limbs 18e.

Above the grooves 19A and 19B, the base 11 comprises two other diametrally opposite grooves 23A and 23B which, towards the axis of the base, are supplemented by recesses 24 (FIGURE 4) debouching laterally into these grooves, so as to form deep notches along the nearest edges of these grooves. Adapted to slide in these grooves are two U-rods 25 whose ends, turned towards one another, can slide and are guided in the tubular sections 26 freely fitted on to these ends.

The grooves 19A, 23A and 19B, 23B (FIGURE 4) formed in the thickest part of the base, are traversed by the limbs 27A and 27B of a wire 27 of fairly large diameter whose central portion 27C, helically wound, constitutes a ring co-axial with the base 11, the two limbs 27A and 27B are held in position by the stop screws 28 (FIGURE 4).

Figure 6:
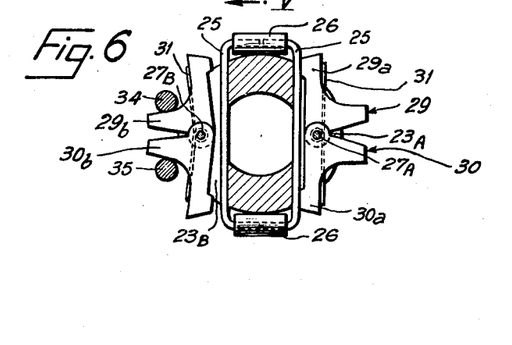
FIGURE 6 is a sectional view on VI—VI of FIGURE 4.

Level with the grooves 23A and 23B, the limbs 27A and 27B (FIGURE 6) serve as pivots for two pairs of bellcrank levers 29, 30, whilst at the level of the grooves 19A and 19B, they serve to hold the central portion of the torsion springs 31 whose ends bent-over at right angles come to act on the limbs 29a and 30a of the levers 29 and 30, the ends of the said limbs being directed towards the U-rods 25. Thus, by means of these springs 31, these U-rods tend to be repelled towards the position where their central portions are nearest, that is to say opposite the notches 24.

Figure 7:
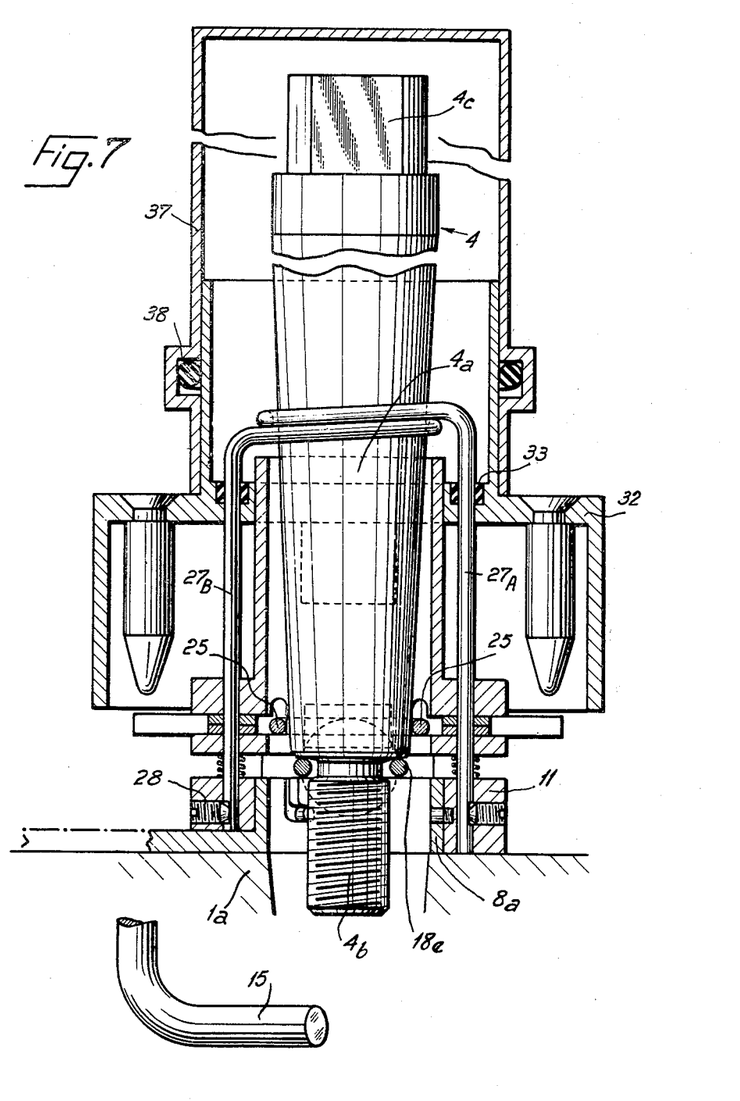
FIGURE 7 is a sectional view similar to FIGURE 4, the pin being in the device.

The casing 32 which envelops the base 11 is adapted to slide with an easy fit on the said base (FIGURES 4 and 7). The limbs 27A and 27B extend through this casing in lining elements made of resilient material 33 having a high co-efficient of friction on the said limbs, so that the casing 32 is held immobile on the said limbs by this friction in the position in which it has been placed.

This casing 32 comprises internally two pairs of conical pins, the two conical pins 34 and 35 of each pair being adapted to co-operate with the noses 29b, 30b (FIGURE 6) of one of the two pairs of levers 29, 30 to make the latter approach, and, consequently, to move apart the portions 29a, 30a of the rods 25 when the casing 32 is brought into the lower portion as shown in FIGURE 4. On a diameter perpendicular to that which the limbs 27A and 27B define, the casing 32 also comprises two studs 36 (FIGURE 5) which, during the descent of this casing to the position shown in FIGURE 4, encounter the tubes 26 fitted over the ends of the U-rods 25, which moreover limits the descending travel of the casing 32 in the position shown in FIGURE 4.

Figure 3:
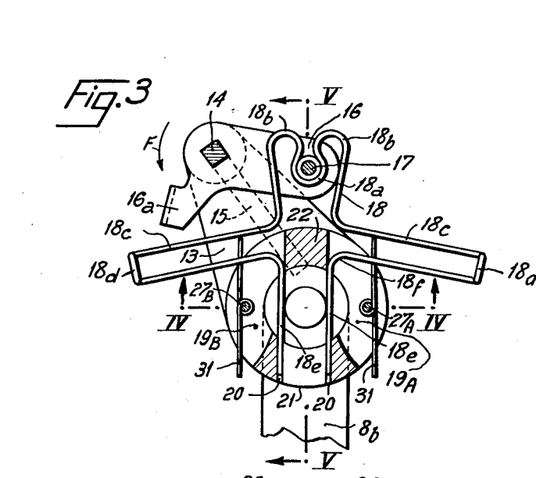
FIGURE 3 is a sectional view perpendicularly to the axis of the pin, corresponding to III—III of FIGURE 4, of the portion of the device serving for guiding and holding the pin.

The device which has just been described is used and operated in the following manner:

When the blades are in the folded position, the assembly 5 is put in position on the sleeve 8a, and, the casing 32 being in the raised position shown in FIGURE 7, the spring 18 is deformed manually in such a manner that its limbs 18e assume the position shown in FIGURE 3, which, entraining the assembly 14, 15, 16 brings the crankpin element 15 into the path of travel of the flange 2a of the blade root (FIGURE 2).

The casing 32 is then lowered into the position shown in FIGURE 4, which has the result, owing to the action of the conical pins 34, 35, of moving apart the levers 29, 30 (FIGURES 6 and 10) and at the same time of making the rods 25 issue from the notches 24 (if they had remained therein owing to previous use) by means of the action of the studs 36 on the tubes 26.

The casing 32 is then lifted into the position shown in FIGURE 7, that is to say substantially until abutment is achieved against the upper elbows of the limbs 27A and 27B.

The levers 29 and 30 thus released come to bear against the rods 25 (FIGURES 6, 7 and 10) and hold them at their minimum distance. The pin 4 can then be positioned in such a manner that it rests by its shoulder on the limbs 18e and forces the rods 25 slightly apart. The entire arangement is then capped with a cap 37 which is held in position by means of the resilient sealing element 38 which grips the periphery of the casing 32. It will be remarked that the cap 37 could not be positioned on the casing 32 if the latter had remained in the lowered position, which makes it necessary to lift this casing and consequently to release the levers 29, 30.

When the blade root (FIGURES 1 and 2), whilst pivoting about the pin 3 which has been left in position, is near its final position, one of the flange limbs 2a encounters the crank-pin element 15 and causes the assembly 14, 15, 16 to rotate in the direction of the arrow F in FIGURE 3, which has the result of the wire spring 18 being subjected to an axially effective tractive force.

Figure 9:
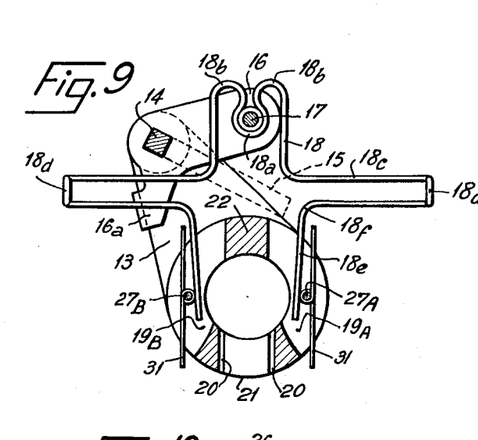
FIGURES 9 and 10 are sectional views on IX—IX and X—X of FIGURE 8.

As soon as the ends of the limbs 18e are detached from the notches 20 which hold them, these limbs move apart suddenly and take up the position shown in FIGURE 9, coming to abut against the limbs 27A and 27B. The pin 4, being no longer retained, falls into the bore formed by the aligned apertures, and during its passage it forces the rods 25 and the levers 29, 30 to move apart in opposition to the springs 31 (right-hand part of FIGURE 6).

As soon as the thickest portion 4a of the pin has passed the interval between the rods 25, the latter, once more urged by the springs 31 and the levers 29, 30, approach one another and come opposite the notches 24.

Figure 10:
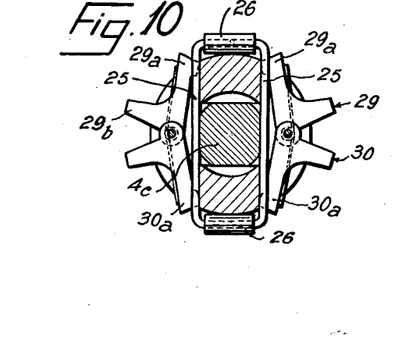

If, by its fall, the pin 4 is in the conical bore, a nut 52 (FIGURE 8) can be screwed and clamped in position without the pin moving. However, if when engaging this nut, the pin is moved upwards which releases it from being wedged in any way, owing to the action of friction or, if appropriate, by encountering the shoulder of the head of the pin, this pin entrains the rods 25 upwardly into the notches 24. As soon as these rods have thus moved upwards again as illustrated in FIGURE 10 the ends 29a and 30a of the levers 29 and 30 pass below the rods 25, preventing them from re-descending and issuing from the notches 24. As this instant, the rods 25 embrace the polygonal surfaces of the head 4c and can no longer move apart, and therefore the nut 52 can be tightened by means of a wrench.

FIGURE 10 makes it easy to understand how, at the moment of re-using the device 5, it may be necessary by the double action of the conical pins 34, 35 and then the studs 36, to move the levers 29, 30 apart and to cause the rods 25 to re-descend to the grooves 23A, 23B.

Figures 8, 11:
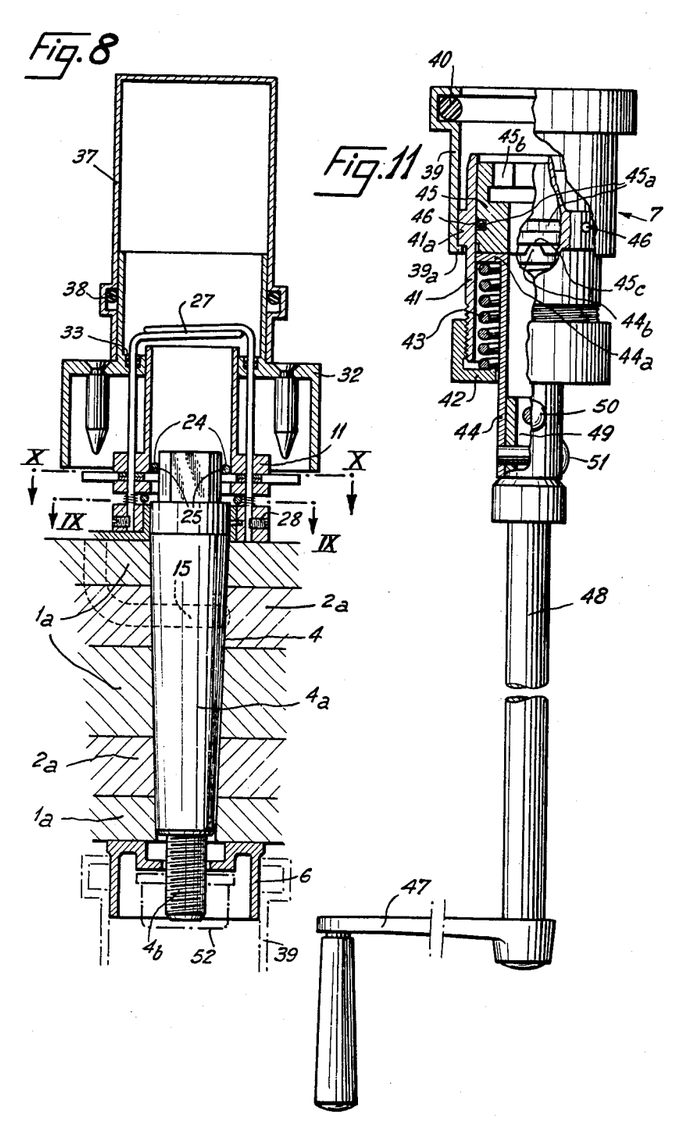
FIGURE 8 is a similar sectional view showing the pin moved down into the connecting position.
FIGURE 11 shows, partly in section and partly in elevation with parts broken away, a wrench intended for fixing the nut on the pin.

FIGURE 11 shows a wrench intended to permit of the remote positioning of the nut on the screwthreaded end 4b.

The wrench, which is given the general reference numeral 7 in FIGURE 2, is composed of a sleeve 39 adapted to be held in position by the resilient sealing element 40 on the guide cup 6. This sleeve contains an inner sleeve 41 which is retained by its shoulder 41a bearing against the collar 39a of the said sleeve. The lower end of this inner sleeve 41 is screwthreaded and receives the hollow nut 42 which serves for regulating the compression of the inner spring 43. At its other end, this spring bears against the flange 44a of a tubular element 44. The flange 44a carries two trapezium-shaped bosses 44b which are engaged in a diametral groove 45c of the wrench head 45. This wrench head is held in position, in opposition to the axial thrust of a spring 43, by two straight pins 46 whose ends are engaged in the inner sleeve 41a and whose central portions are positioned in the groove 45a of the wrench head 45. The active portion of the wrench head is shaped as a hexagonal socket 45b into which the nut 52 is received. In order to rotate the wrench head, the crank 47 and rod 48 are used, and the latter is connected to the tubular element 44 by means of an intermediate strap 49 and two pivot pins 50 and 51 arranged at right angles to one another. When the clamping force becomes excessive, the bosses 44b can no longer drive the wrench head 45 in rotational movement, and escape from the groove 45c compressing the spring 43.

The optimum clamping effect is thus obtained on the nut 52.

Figures 12, 14, 15, 16:
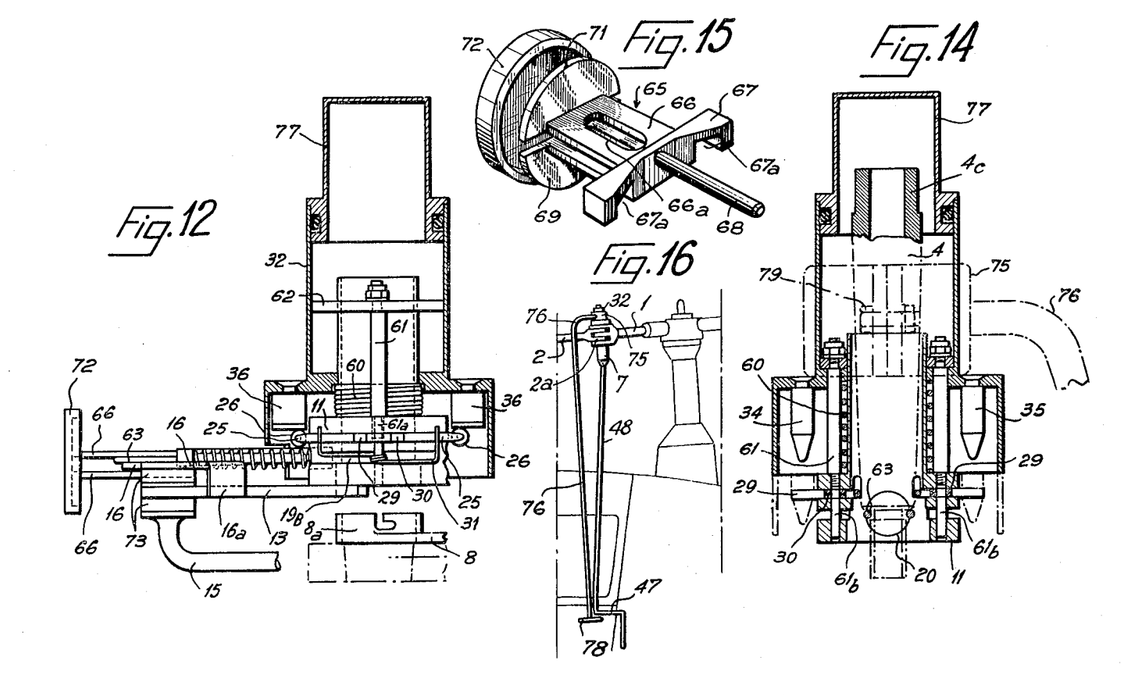
FIGURE 12 is a vertical sectional view of a modified form of embodiment of the invention.
FIGURE 14 is a sectional view perpendicularly to that of FIGURE 12 showing the device in the operative position.
FIGURE 15 is a perspective view of a detail of the push member for positioning the spring in the device shown in detail in FIGURE 13.
FIGURES 16 is a general view of the device in position for positioning a fixing pin of a helicopter rotor blade.

Positioning the spring 18 by hand requires a certain skill and a remedy for this is obtained by using the device shown in FIGURES 12 to 14 which permits this positioning to be effected by rough and ready methods. The device shown in FIGURES 13 and 14 is very similar to that which has just been described. The essential differences are as follows:

The casing 32, capped with a cap 77, which carries the pairs of conical pins 34, 35 and the studs 36, is subjected to the upward pressure of the restoring spring 60 in such a manner that, when the apparatus is in position and the casing 34 has pressure applied thereto, the conical pins 34, 35 and the studs can fulfil their function, but are moved away from the rods 25 and tubes 26 (see FIGURE 14) by the relaxation of the spring 60 as soon as this action is no longer useful.

Furthermore, the limbs 27a and 27b of the wire 27 (ring-shaped at its central portion) are replaced by two rods 61 which are screwed into the base 11 at 61a and which, screwthreaded at their upper portion, are connected by the ring 62 which is slidable within the casing 32.

These rods 61 have the same functions as the limbs 27 in FIGURES 4 and 7, namely they serve as pivot pins for the levers 29, 30 and as core pins for torsion springs 31 at their lower smooth portion of smaller diameter 61b (FIGURE 14). The spring 18 is replaced (see FIGURES 13a to 13d) by a spring 63 in the form of a pair of pincers whose two limbs 63a and 63b are curved in their central portion, the concavities of these central portions facing towards one another.

The ends of these limbs engaged in the grooves 19A and 19B of the base 11 in the position of rest free, as before, the duct provided in the base 11 for the passage of the pin (FIGURE 13a), whilst in the operative position (FIGURE 13d) these ends, engaged in the lateral notches 20 of the circular opening 21, oppose the descent of the pin 4 (see also FIGURE 14).

The apex of the hairpin spring, shaped as previously, is again held by the pin 17 engaged in the crank-pin element 16.

It will be recalled that when the flange 2a (FIGURE 1) encounters the crank-pin element 15, it causes pivoting movement about the pivoting axis of the two crank-pin elements 15, 16, which enables the limbs of the spring 63 to move apart in order to permit the descent of the pin 4.

For positioning the spring 63, there is used a push member which is given the reference numeral 65 and whose form is shown in detail in FIGURE 15. This push member, whose body can be machined in a single piece, comprises two parallel plates 66 which enclose (FIGURE 18) the spring 63 and the flat crank-pin element 16; these plates, held by the pin 17 and its nut, can slide transversely with respect to this pin, being provided with elongated apertures 66a. The two plates 66 are connected at one side by a part in the form of a yoke 67 whose notches 67a (FIGURE 15) fit over the limbs 63a and 63b of the spring. This yoke is fast with a perpendicular push member 68 which can engage in a slot 69 (FIGURE 13a) of the base 11 for the guiding of the said push member, the latter being also subjected to the action of the guiding and restoring spring 70. At the side opposite from the yoke, plates 66 are fast with two half-moon elements 71 (FIGURE 15) on to which fits a cap 72 which can advantageously be fixed to these half-moon elements by gluing after the push member is assembled.

Figure 13A:
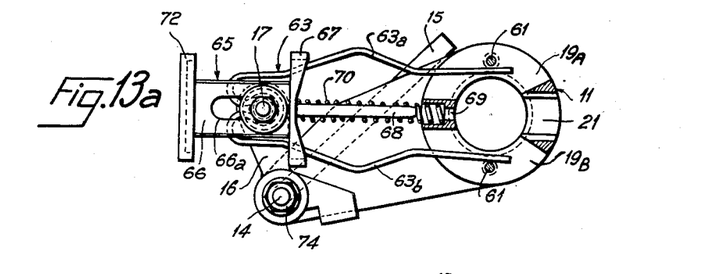
FIGURES 13a to 13d detail the method of operation used in the variant shown in FIGURE 13 of the device for positioning the spring with its two resilient arms which is to support the pin.
Figure 13B:
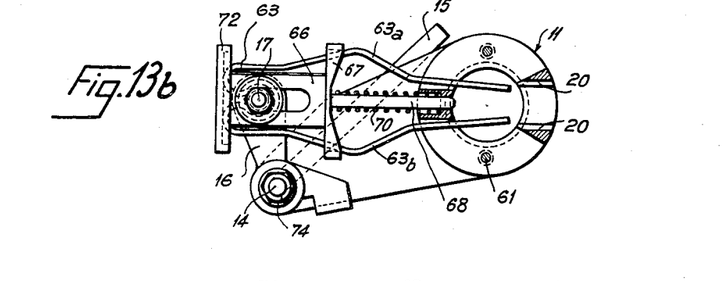
Figure 13C:
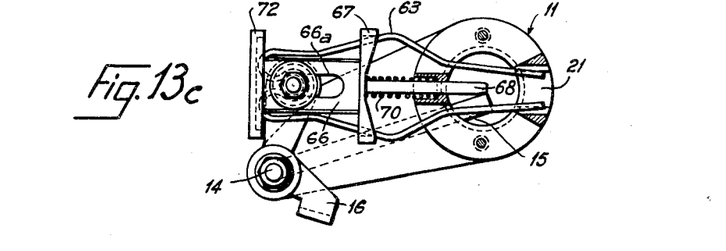
Figure 13D:
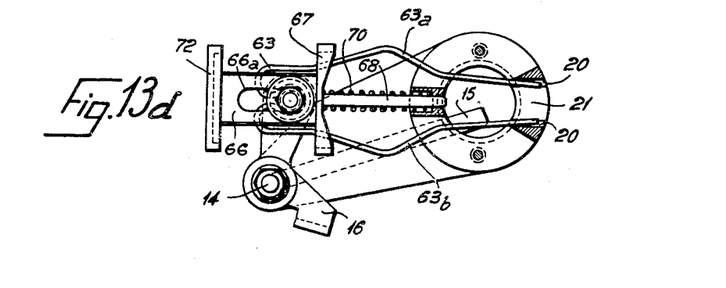

Finally, the pin 14 is braked in its pivoting movement relatively to the plate 13 fast with the base by two friction washers 73 arranged on either side of this plate (FIGURE 12) and clamped by the nut 74 (FIGURE 13a).

After its use, the device is in the position illustrated in FIGURE 13a. If a sudden pressure is exerted on the cap 72, this causes, as FIGURE 2b shows, a sliding movement of the push member in the direction of the base 11, so that the yoke 67 sliding along the curved portion of the limbs 63a and 63b brings the said limbs towards one another, so that the spacing of the ends of the limbs becomes smaller than the distance of the grooves 20.

If the pressure movement on the cap 72 is continued, the assembly is then pivoted about the pin 14 in opposition to friction, so that the limb 15 comes to be interposed, as is desirable, in the path of travel of the flange part 2a which is to be pinned (FIGURES 2 and 16) whilst the ends of the limbs of the spring 63 enter the circular aperture 21.

Then when the pressure on the push member is discontinued, the yoke 67 disengages from the limbs of the spring 63 under the pressure of the spring 70, but the pressure of this spring is insufficient to cause the crank-pin elements 15 and 16 to pivot in the opposite direction owing to the friction which immobilises the pin 14.

The devices then set and can operate as has already been explained since the limbs 63 and 63b oppose the descent of a pin 4.

In order to effect the remote demounting of the pin-positioning device, leaving in position only the part 8 provided with the sleeve 8a which permits its fixing, the following procedure can be adopted. The casing 32 is held by a collar 75 which can be clamped by a bolt 79, the said collar being provided with an operating arm 76. As FIGURE 16 shows, this figure illustrating the post carrying the rotor hub of a helicopter, this operating arm is positioned near the device 7-48 for the rapid screwing of the nut 52.

After this nut has been tightened, the arm 76 which terminates in the handle 78 makes it possible to rotate the casing 32 and, consequently, the base 11 (by means of the rods 61) in order to disengage this base from the sleeve 8a, and then to lift the entire device to separate it from the hub of the helicopter without using an auxiliary means in order to reach the level of this hub.

I claim:
1. A helicopter rotor comprising a plurality of blades of which at least one comprises a conically apertured root portion; a rotor hub having means for pivotally carrying said one blade and a conically apertured forked portion adapted for cooperation with said root portion in registering relationship of said conical apertures when said one blade is in operative position; a frusto-conical pin adapted for clamping said one blade with respect to said hub by entering said registering apertures; a tubular recessed base member secured to said hub forked portion coaxially with the conical apertures thereof; a two-limbed spring for supporting said pin coaxially in said member in waiting position, said spring limbs being yieldingly held towards one another by engagement of their ends in one recess of said base member; and a mechanical transmission carried by said hub having one element protruding in said forked portion, said transmission being adapted for urging said spring away from said one recess for disengaging said limbs from said recess when said one element of said transmission is encountered by the said root portion during pivotal motion of said blade toward said operative position.

2. A helicopter rotor according to claim 1, wherein the axis of the coinciding apertures said root and forked portions is substantially vertical and the pin is moved by its own weight when the limbs of the spring move apart.

3. A helicopter rotor according to claim 1, wherein the mechanical transmission is constituted by two crank-pin elements fast with a spindle parallel to the axis of the forked portion apertures, one of the crank-pin elements being arranged in the path of travel of said root portion whilst the spring is attached to the second crank-pin element.

4. A helicopter rotor according to claim 1, wherein the mechanical transmission is constituted by two crank-pin elements fast with a spindle parallel to the axis of the forked portion apertures, one of the crank-pin elements being arranged in the path of travel of said root portion whilst the spring is attached to the second crank-pin element which encounters its support in order to limit the rotational angle of the assembly constituted by the two crank-pin elements.

5. A helicopter rotor according to claim 1, wherein the said frusto-conical pin comprises, at its tapered end, a screwthread and at its opposite end a polygonal head which is smaller in cross-section than the thickest part of the pin, the said pin resting, by means of a shoulder provided between the screw-threaded portion and the tapering portion, on the limbs of the spring.

6. A helicopter rotor according to claim 1, wherein the said frusto-conical pin comprises, at its tapered end, a screwthread and at its opposite end a polygonal head which is smaller in cross-section than the thickest part of the pin wherein said tubular member has two diametrically facing further recesses extending in axial notches in their nearer portions and further comprising two members located in said further recesses having parallel edges facing one another, transversely to the pin, means for resiliently pressing said members towards one another but adapted to be forced apart for the passage of the frusto-conical portion of the pin, the ends of these members engaging said notches when said members are in the approached position and when the pin is repelled in the direction opposite to its penetrating movement in order to embrace the sides of the pin head and a nut cooperating with said screw thread.

References Cited by the Examiner
UNITED STATES PATENTS

| | | | |
|---|---|---|---|
| 2,660,752 | 12/53 | Carcereny | 16—147 |
| 2,925,130 | 2/60 | Buivid | 170—160.12 |
| 3,048,898 | 8/62 | Davis | 20—16 |
| 3,106,963 | 10/63 | Posniok et al. | 170—160.12 |

JULIUS E. WEST, *Primary Examiner.*